United States Patent
Hayashi

(10) Patent No.: US 7,102,314 B2
(45) Date of Patent: Sep. 5, 2006

(54) BRUSHLESS MOTOR CONTROL APPARATUS HAVING OVERHEAT PROTECTING FUNCTION

(75) Inventor: Yoshitaka Hayashi, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/053,030

(22) Filed: Feb. 8, 2005

(65) Prior Publication Data

US 2005/0174090 A1  Aug. 11, 2005

(30) Foreign Application Priority Data

Feb. 10, 2004  (JP) ............................. 2004-033206

(51) Int. Cl.
G05B 24/04  (2006.01)

(52) U.S. Cl. .................. 318/563; 318/563; 318/254; 318/139; 318/439; 318/807; 361/31

(58) Field of Classification Search ............... 318/783
See application file for complete search history.

(56) References Cited

U.S. PATENT DOCUMENTS

| | | | | | |
|---|---|---|---|---|---|
| 4,169,990 | A | * | 10/1979 | Lerdman | 318/138 |
| 4,780,658 | A | * | 10/1988 | Koyama | 318/808 |
| 5,047,704 | A | * | 9/1991 | Yamauchi | 318/801 |
| 5,093,891 | A | * | 3/1992 | Komiyama et al. | 388/813 |
| 5,247,237 | A | * | 9/1993 | Koyama et al. | 318/808 |
| 5,446,354 | A | * | 8/1995 | Hiruma | 318/439 |
| 5,521,482 | A | * | 5/1996 | Lang et al. | 318/800 |
| 5,586,043 | A | * | 12/1996 | Breen et al. | 702/64 |
| 5,644,458 | A | * | 7/1997 | Schoen et al. | 361/31 |
| 5,760,556 | A | * | 6/1998 | Hamilton et al. | 318/438 |
| 5,838,591 | A | * | 11/1998 | Yamaguchi | 700/299 |
| 5,920,161 | A | * | 7/1999 | Obara et al. | 318/139 |
| 5,929,576 | A | * | 7/1999 | Yasohara et al. | 318/254 |
| 6,046,553 | A | * | 4/2000 | Matsunaga et al. | 318/139 |
| 6,147,470 | A | * | 11/2000 | Ohashi et al. | 318/757 |
| 6,198,184 | B1 | * | 3/2001 | Ohi et al. | 310/68 C |
| 6,198,241 | B1 | * | 3/2001 | Calamatas | 318/434 |
| 6,268,708 | B1 | * | 7/2001 | Kawada et al. | 318/430 |
| 6,268,986 | B1 | * | 7/2001 | Kobayashi et al. | 361/24 |
| 6,324,038 | B1 | * | 11/2001 | Kishibe et al. | 361/31 |
| 6,326,753 | B1 | * | 12/2001 | Someya et al. | 318/471 |
| 6,705,420 | B1 | * | 3/2004 | Ono et al. | 180/407 |
| 6,822,839 | B1 | * | 11/2004 | Habetler | 361/30 |
| 6,838,840 | B1 | * | 1/2005 | Dainez et al. | 318/254 |
| 6,885,162 | B1 | * | 4/2005 | Stridsberg | 318/254 |
| 6,888,729 | B1 | * | 5/2005 | Maekawa et al. | 363/56.02 |

(Continued)

FOREIGN PATENT DOCUMENTS

JP  2003164185  * 11/2001

(Continued)

*Primary Examiner*—Rina Duda
*Assistant Examiner*—Robert Horn
(74) *Attorney, Agent, or Firm*—Harness, Dickey & Pierce, PLC

(57) ABSTRACT

A brushless motor control apparatus detects a phase current flowing in a brushless motor, converts the phase current to a vector current including a d-axis current of a magnetic flux direction component and a q-axis current of a torque direction component orthogonal to the d-axis current, calculates a vector voltage instruction value based on differences between a vector current and a vector current instruction value, calculates a phase voltage instruction value and controls rotation of the brushless motor based on the phase voltage instruction value. The apparatus further calculates electric power produced in the brushless motor and protects the brushless motor based on the magnitude of electric power.

5 Claims, 6 Drawing Sheets

U.S. PATENT DOCUMENTS

| | | | |
|---|---|---|---|
| 6,895,176 B1 * | 5/2005 | Archer et al. | 388/825 |
| 6,949,945 B1 * | 9/2005 | Klein | 324/772 |
| 2002/0093300 A1 * | 7/2002 | Karwath et al. | 318/254 |
| 2003/0076061 A1 * | 4/2003 | Kleinau et al. | 318/432 |
| 2004/0000883 A1 * | 1/2004 | Alex et al. | 318/254 |
| 2004/0056618 A1 * | 3/2004 | Yoshihara | 318/439 |
| 2004/0184206 A1 * | 9/2004 | Nomura et al. | 361/31 |
| 2004/0201938 A1 * | 10/2004 | Watanabe et al. | 361/103 |
| 2005/0151377 A1 * | 7/2005 | Ichinose et al. | 290/44 |
| 2005/0162113 A1 * | 7/2005 | Fujimoto et al. | 318/434 |
| 2005/0174090 A1 * | 8/2005 | Hayashi | 318/807 |

FOREIGN PATENT DOCUMENTS

| | | |
|---|---|---|
| JP | 2003-164185 | 6/2003 |

* cited by examiner

BRUSHLESS MOTOR CONTROL APPARATUS HAVING OVERHEAT PROTECTING FUNCTION

CROSS REFERENCE TO RELATED APPLICATION

This application is based on and incorporates herein by reference Japanese Patent Application No. 2004-33206 filed on Feb. 10, 2004.

FIELD OF THE INVENTION

This invention relates to a brushless motor control apparatus, and more specifically, to a method for preventing a brushless motor from overheating.

BACKGROUND OF THE INVENTION

In a motor system, an excessive current higher than that under normal operating condition flows in motor windings due to dielectric breakdown, overload, forced constraint, or the like. If such an excessive current flows, temperatures of the windings rise and exceed a heat-withstanding temperature of insulating coating of the windings, dielectric breakdown occurs, the windings short out. This further leads to abnormal operations of an apparatus connected to the motor.

To prevent such overheating of the windings, temperature protective devices such as a thermistor and a thermal fuse are attached and the temperature rise is suppressed by limiting currents flowing in the windings in response to winding temperatures or cutting off currents when they exceed a predetermined temperature. However, such overheat protection needs addition of a thermistor, a thermal fuse, etc. and addition of a peripheral circuit for detection. This causes increase in cost.

Moreover, as overheat protection techniques of the direct current motor, winding temperatures are estimated from a motor current value squared and a motor resistance value, and the current is limited according to the estimated temperature because the winding temperature is proportional to a product of the motor current value squared by the motor resistance value.

The brushless motor uses three-phase alternating currents. Consequently its accurate state cannot be grasped, except that the sampling period and calculation period of current, voltage, etc. are done at high speed. In a worst case, it is likely that calculation results may be different from actual values depending on the sampling period (for example, only low current values of the alternating waveform are sampled), and hence dielectric breakdown may occur due to a failure of the overheat protection.

For example, supposing that the brushless motor with 16 poles is in rotation at 2000 rpm, a motor current waveform becomes an alternating waveform of a period of 3.75 ms. That is, if this alternating waveform is intended to be sampled accurately and subjected to calculation, it must be performed in a period of a few hundreds of micro seconds or less, which increases a calculation load of a microcomputer. To prevent the calculation load in the microcomputer from increasing, a microcomputer capable of high-speed processing is necessitated. This will result in an increase of cost.

It is also proposed in JP 2003-164185A to realize the overheat protection by using a q-axis current that is a torque component current of the brushless motor, or both the q-axis current and a d-axis current that is an exciting component current while preventing increase in cost and calculation load.

The brushless motor is driven by the three-phase alternating currents. Each of its voltage, current, magnetic flux, etc. is represented by a composite vector that is a vector sum of components generated by alternating components of each phase. When driving the brushless motor, its control is simplified by converting the three-phase alternating currents that necessitate handling these vectors to two-axis direct currents.

This two-axis direct current conversion means conversion whereby a motor having a fixed part and a rotating part is converted to one in an orthogonal coordinate system whose coordinates are both fixed, i.e., a rotating orthogonal coordinate system, and is called d-q conversion. The q-axis is in advance of the d-axis by a phase of $\pi/2$ and the d-axis is orientated in a direction of a magnetic flux formed by a field magnet.

In the direct current motor, a field magnet circuit is formed with permanent magnets or by flowing constant field-magnet currents in field-magnet windings. Independently from it, an armature current is supplied in a rotor conductor from the outside, whereby a torque proportional to the armature current can be generated. Therefore, the direct current motor is rotated with the torque proportional to the armature current.

On the other hand, in the brushless motor, the rotor is not electrically connected with the outside. That is, only a primary current flowing in the stator generates both a rotating magnetic field and an induction current equivalent to the armature current. Therefore, the primary current contains both a current (exciting component current) that generates a secondary interlinkage flux crossing a secondary-side rotor and a current (torque component current) that flows in a secondary-side conductor.

A technique of controlling these two currents independently is the d-q conversion described above. With this conversion, if the exciting component current (d-axis current) is controlled to be constant, the torque component current (q-axis current) will be proportional to the torque. Therefore, the use of this q-axis current enables the brushless motor to be vector-controlled as in the case of the direct current motor.

Here, the principle of vector control will be described using FIG. 7. The magnitude and phase of a current determines the torque of the brushless motor, the alternating current motor, or the like. In practice, the current is divided into a current component (magnetic flux current) that forms a magnetic flux in the direction of a main magnetic flux established inside the motor and a current component with a phase advanced by 90° that controls the torque directly (torque current).

The two components are controlled independently. The magnetic flux current and the torque current are defined as a current component that forms a magnetic field in the d-axis direction and a current component that forms a magnetic field in the q-axis direction, respectively. The fact that each of the current, voltage, and magnetic flux is controlled after being divided into a d-axis component and a q-axis component may account for a name of the vector control. These current components can be calculated by the well known three-phase to two-phase conversion based on a rotation angle θ of the main magnetic flux to the stator in the d-q axis coordinate system.

Moreover, in estimation calculation of the winding temperature (electric power), the use of the d-axis current in addition to the q-axis current enables estimation with higher accuracy than that of an estimation only with the q-axis current, although it adds a slight increase in the calculation load.

However, in the above conventional method, because the brushless motor uses the three-phase alternating currents, when the motor is in rotation or when the motor is not in rotation and yet predetermined currents are flowing through it so as to produce a torque (motor lock state), currents applied to phase windings might differ largely among them even if the q-axis current or the d-axis current is the same. The current also might differ depending on a motor locking position (electrical angle).

As a result, in the case where only the q-axis current or the d-axis current is used to estimate the winding temperatures and the overheat protection is performed, estimation errors may occur and excessive overheat protection may be executed, which impedes the production of sufficient torque by the motor. Otherwise, too little overheat protection may result in short circuit of the windings, which leads to abnormal operations of an apparatus connected to the motor.

SUMMARY OF THE INVENTION

It is therefore an object of this invention to provide a brushless motor control apparatus capable of realizing overheat protection that avoids excessive or too little overheat protections with a minimum increase in cost and calculation load.

According to the present invention, a brushless motor control apparatus calculates electric power or energy produced in a brushless motor based on a q-axis current, and protects the brushless motor or a motor control unit based on the magnitude of the electric power.

Since the q-axis current of the brushless motor can be treated as in the case of a detected current value of the direct current motor, the use of the q-axis current for overheat protection makes it possible to employ a technique of overheat protection of the direct current motor. Beside, the use of the q-axis current, which hardly varies unlike the three-phase current varying periodically, enables the sampling period to be made longer.

This can prevent an increase in the calculation load of a microcomputer and checks an increase in the cost resulting from additional parts, such as a thermistor. In addition, since the electric power produced in the brushless motor and the winding temperature are in a proportional relationship, the overheat protection can be performed accurately by calculating the electric power produced in the brushless motor.

Preferably, the brushless motor control apparatus detects the electrical angle of the brushless motor, and calculates the electric power produced in the brushless motor when it makes rotation equivalent to one cycle period of the electrical angle.

FIG. 4A shows schematically the windings of the brushless motor. Currents flowing in U-phase, V-phase and W-phase windings are represented by Iu, Iv and Iw. The peak value of theses phase currents are represented by Im, respectively. Here, Iu, Iv and Iw are expressed as follows.

$Iu = Im \times \sin \omega t$ $Iv = Im \times \sin(\omega t - 2\pi/3)$ $Iw = Im \times \sin(\omega t - 4\pi/3)$ The electric power Wa, Wb, and Wc that are produced in the respective phase windings are expressed as follows.

$Wu = Iu^2 \times R = Im^2 \times R \times \sin^2(\omega t)$ $Wv = Iv^2 \times R = Im^2 \times R \times \sin^2(\omega t - 2\pi/3)$ $Ww = Iw^2 \times R = Im^2 \times R \times \sin^2(\omega t - 4\pi/3)$, where $\omega t$ is the electrical angle of the motor.

Since the currents flowing in the U-phase, V-phase and W-phase windings are alternating currents, the electric power produced in the brushless motor when it makes rotation corresponding to one cycle period of the electrical angle can be used as references. Since the q-axis current is used as a current whereby the electric power is calculated, this construction makes it possible to calculate the produced electric power accurately and prevent an increase in calculation load.

Further preferably, the brushless motor control apparatus uses a predetermined coefficient for setting a predetermined value for overheat protection. This predetermined coefficient takes different values in two states: when the brushless motor is energized but not rotated; and when the brushless motor is energized and rotated.

For example, when an ideal state where the phases of the brushless motor have no deviations at all is considered, the d-axis current $i_d$ becomes zero and the q-axis current $i_q$ becomes $\sqrt{(3/2)} \times Im$. With the q-axis current $i_q$ being constant, in the case where the motor is locked when any one of the U-phase, V-phase and W-phase current is at a peak current (being energized but not rotated), the phase electric power produced during one cycle period of the electrical angle ($\omega t = 0 - 2\pi$) will be $2\pi \times Im^2 \times R$ by the formula 1. This is equivalent to the area of a rectangular portion formed by a short side part defined by the current values of 0 and Im and a long side part defined by angles of 0° and 360°.

At the time of rotation, the phase electric power produced during one cycle period of the electrical angle ($\omega t = 0 - 2\pi$) will be $\pi \times Im^2 \times R$ by the formula 2. This is equivalent to the area of a shaded portion in FIG. 4B. Representing the above value using the q-axis current $i_q$ that is actually used for the calculation instead of Im, the phase electric power of any one of the U-phase, V-phase and W-phase windings when the motor is locked at the peak current will be $2\pi \times 2/3 \times i_q^2 \times R$, and the phase electric power at the time of rotation will be $\pi \times 2/3 \times i_q^2 \times R$.

$$\int_0^{2\pi} Wa = \int_0^{2\pi} (Im^2 R) d(\omega t) \qquad \text{[Formula 1]}$$
$$= Im^2 R [\omega t]_0^{2\pi} = 2\pi Im^2 R$$

$$\int_0^{2\pi} Wa = \int_0^{2\pi} (Im^2 \sin^2(\omega t) R) d(\omega t) \qquad \text{[Formula 2]}$$
$$= Im^2 R \left[ -\frac{1}{4} \sin 2(\omega t) + \frac{\omega t}{2} \right]_0^{2\pi} = \pi Im^2 R$$

This shows a relationship that the electric power per phase in the case of motor locking at the peak current double the electric power per phase at the time of rotation. Therefore, assuming that the coefficient when the motor is locked at the peak current is 1, the coefficient at the time of rotation may be set to one half. Because all that is necessary is to set a predetermined coefficient used to multiply the electric power in advance by virtue of this construction, a threshold for the overheat protection can be set simply and hence increase in calculation load can be avoided.

Furthermore, there is a case where a current applied to each phase winding may change also with the locking position (electrical angle). Representing the peak current of each phase current by Im as shown in FIG. 5, when the motor is locked with an electrical angle of, for example, 30° (point A), the V-phase current is represented by Im, whereas the U-phase current and the W-phase current are represented by 0.5×Im (point C), respectively.

Moreover, when the motor is locked with an electrical angle of 60° (point B), the W-phase current is zero, whereas the U-phase current and the V-phase current are represented by 0.866×Im, respectively. So, each phase current at the time of motor locking differs from phase to phase.

Here, there is a predetermined mutual relationship among the U-phase, V-phase and W-phase currents of the brushless motor. That is, to calculate the electric power (estimated temperature) of each phase winding using the q-axis current, all that is necessary is to multiply the electric power when the motor is locked at the peak current by a coefficient (sin ωt) that varies with the electrical angle (ωt) of each phase.

By these steps, it becomes possible to reduce estimation errors considerably and calculate the electric power (estimated temperature) of each phase winding, and hence the same effect as is given by estimation calculation of the winding temperatures of the brushless motor using the three-phase alternating currents can be obtained. Therefore, it becomes possible to perform appropriate overheat protection based on the maximum of the estimation temperature of each phase winding.

Therefore, in implementing the overheat protection of the brushless motor by estimating the motor winding temperatures (electric power) using the q-axis current, i.e., a torque component current of the brushless motor, the use of information on the rotation state of the motor and the position of the rotor enables to reduce estimation errors considerably and avoid excessive or too little overheat protections, and also enables to prevent both increase in the cost resulting from additional parts and increase in the calculation load resulting from the use of the phase current.

The brushless motor control apparatus can be applied to electronic power steering apparatus of vehicles whereby a brushless motor is driven on energization and assisting steering torque is given to a steering mechanism triggered by driver's steering operations.

In the electronic power steering apparatus, there is a case where a vehicle is traveling with the steering maintained at a fixed angle. This case corresponds to the motor lock state described above. The rotation state of the motor varies rapidly with the operation state of the steering or a driving state. Even in such a case, the application of the brushless motor control apparatus can realize the overheat protection that avoids excessive or too little overheat protections.

In estimating the motor winding temperatures, the brushless motor control apparatus uses the q-axis current, which is a torque component current of the brushless motor and is conventionally proposed, or both the q-axis current and a d-axis current, which is an exciting component current. It additionally uses information on the rotation state of the motor and the position of the rotor (electrical angle). This enables estimation errors to be reduced considerably and the same effect as is given by a method of estimation calculation of the motor winding temperatures using the phase current to be obtained.

Consequently, it becomes possible to estimate a temperature (electric power) for each of the three-phase windings by virtue of this construction, select the highest temperature (largest electric power) among the three phases, and perform the overheat protection according to that temperature. This construction permits the overheat protection that avoids excessive or too little overheat protections while suppressing increase in cost and calculation load.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

[Embodiment]

Figure 1:
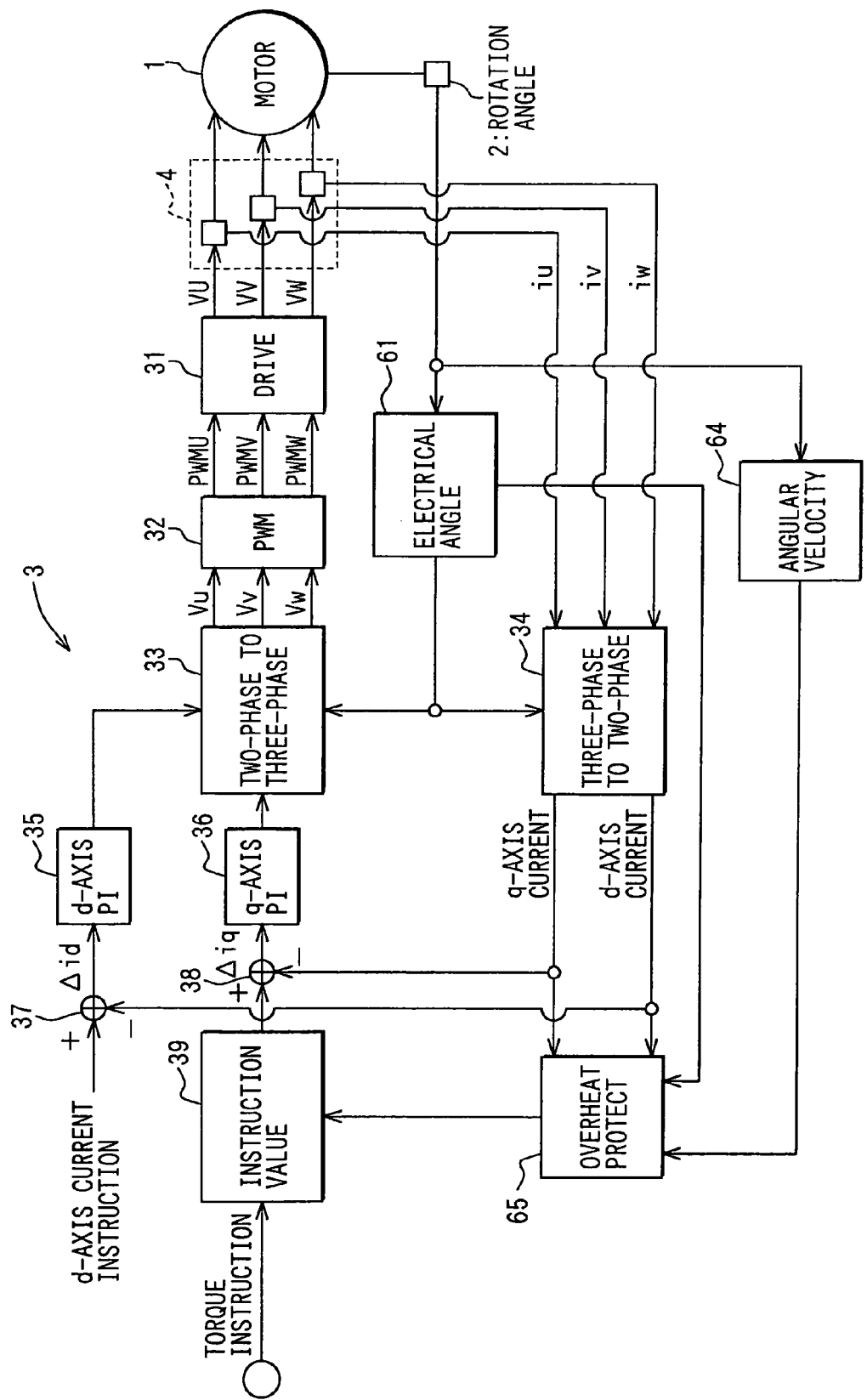
FIG. 1 is a circuit diagram showing a three-phase brushless motor control apparatus of this invention.

A brushless motor control apparatus is shown in FIG. 1. Reference numeral 1 denotes a brushless motor, numeral 2 denotes a rotation angle sensor, such as a well known resolver for detecting electrical angle, numeral 3 denotes a controller, and numeral 4 denotes a current sensor.

The controller 3 comprises a drive circuit 31, a PWM conversion unit 32, a two-phase to three-phase conversion circuit 33, a three-phase to two-phase conversion circuit 34, a d-axis PI control unit 35 and a q-axis PI control unit 36 that perform well known PI (Proportional and Integral) control, subtraction circuits 37 and 38, an instruction value arithmetic unit 39, an electrical angle arithmetic unit 61, an angular velocity arithmetic unit 64, and an overheat protection arithmetic unit 65, wherein a construction except for the overheat protection arithmetic unit 65 is the same as that of a known brushless motor control apparatus. The controller 3 includes a known microcomputer with an internal A/D (analog/digital) converter. The controller 3 may however be constructed with an exclusive hardware circuit.

Figure 2:
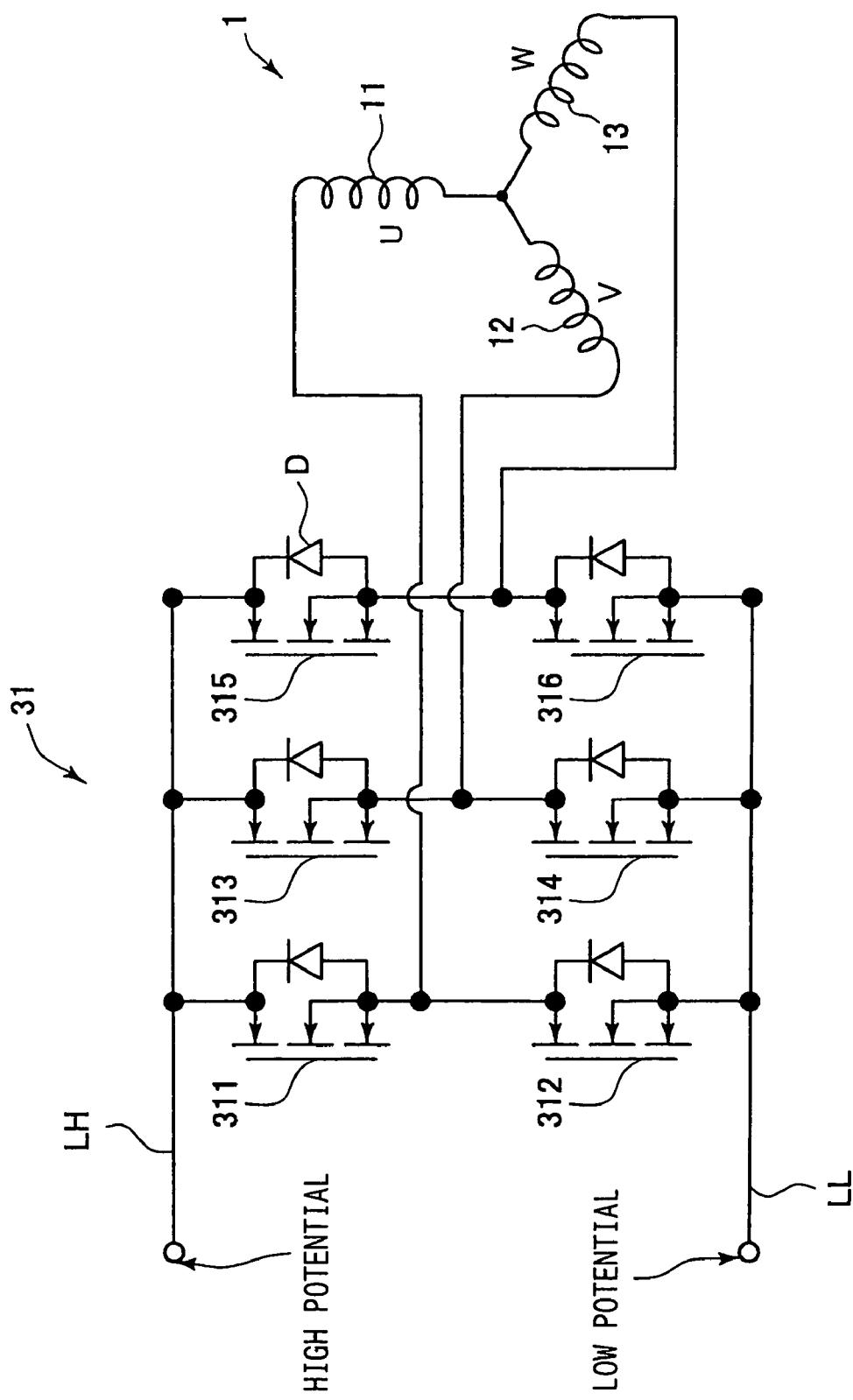
FIG. 2 is a circuit diagram showing a drive circuit in FIG. 1.

As is well known, the drive circuit 31 includes a three-phase inverter circuit as shown in FIG. 2. Reference numerals 311–316 denote MOS power transistors, symbol D a flywheel diode, numeral 311 a U-phase upper arm element, numeral 312 a U-phase lower arm element, numeral 313 a V-phase upper arm element, numeral 314 a V-phase lower arm element, numeral 315 a W-phase upper arm element, and numeral 316 a W-phase lower arm element, wherein each of the elements 311–316 is connected to the flywheel diode D in reverse parallel individually.

Between a low electric potential power supply line LL and a high electric potential power supply line LH, a battery voltage is applied through an unillustrated smoothing circuit, and three-phase alternating voltages outputted from the drive circuit 31 (namely, a three-phase inverter) are applied to each end of a U-phase winding 11, a V-phase winding 12 and a W-phase winding 13 of the motor 1, individually.

The electrical angle arithmetic unit 61 generates a rotation angle signal θ from an analog rotation angle signal outputted from the rotation angle sensor, and outputs it to both the two-phase to three-phase conversion circuit 33 and the three-phase to two-phase conversion circuit 34. The controller 3 performs PWM control of the three-phase brushless motor 1 based on the above phase current, the rotation angle signal and a torque instruction value externally applied.

The three-phase to two-phase conversion circuit 34 converts the applied three-phase current Iu, Iv and Iw into the q-axis current and the d-axis current based on the rotation angle signal ωt outputted from the rotation angle sensor 2. The instruction value arithmetic unit 39 converts the torque instruction value externally applied into a q-axis current instruction value.

The subtraction circuit 38 performs PI conversion of a difference $\Delta i_q$ between the q-axis current $i_q$ and the q-axis current instruction value $i_{qc}$ in the q-axis PI control unit 36, and outputs it to the two-phase to three-phase conversion circuit 33. The subtraction circuit 37 performs PI conversion of a difference $\Delta i_d$ between the d-axis current $i_d$ and the d-axis current instruction value $i_{dc}$ in the d-axis PI control unit 35, and outputs it to the two-phase to three-phase conversion circuit 33.

The two-phase to three-phase conversion circuit 33 converts PI control quantities of $\Delta i_q$ and $\Delta i_d$ applied from the d-axis PI control unit 35 and the q-axis PI control unit 36, respectively, based on the rotation angle signal outputted from the rotation angle sensor 2 to target three-phase voltages Vu, Vv and Vw (phase voltage instruction value) through two-phase to three-phase conversion, and outputs them to the PWM conversion unit 32.

The PWM conversion unit 32 outputs PWM signals, i.e., PWMU, PWMV and PWMW, each of which has a duty ratio corresponding to the applied target three-phase voltages Vu, Vv and Vw to the MOS power transistors 311–316 of the drive circuit 31. The drive circuit 31 drives the motor 1 by outputting the three-phase alternating voltages Vu, Vv and Vw to the motor 1.

Each of PWMU, PWMV and PWMW of the PWM signals includes two PWM signals having mutually opposite signs. To be more precise, the PWM signals include six signals (gate voltages) of a PWMU upper signal, a PWMU lower signal, a PWMV upper signal, a PWMV lower signal, a PWMW upper signal and a PWMW lower signal.

These signals are applied to the elements as follows: the PWMU upper signal to the U-phase upper arm element 311, the PWMU lower signal to the U-phase lower arm element 312, the PWMV upper signal to the V-phase upper arm element 313, the PWMV lower signal to the V-phase lower arm element 314, the PWMW upper signal to the W-phase upper arm element 315 and the PWMW lower signal to the W-phase lower arm element 316.

Since a drive system itself of the three-phase brushless motor by the PWM control described above and its various variations are well known, further detailed explanation is omitted.

Figure 3:
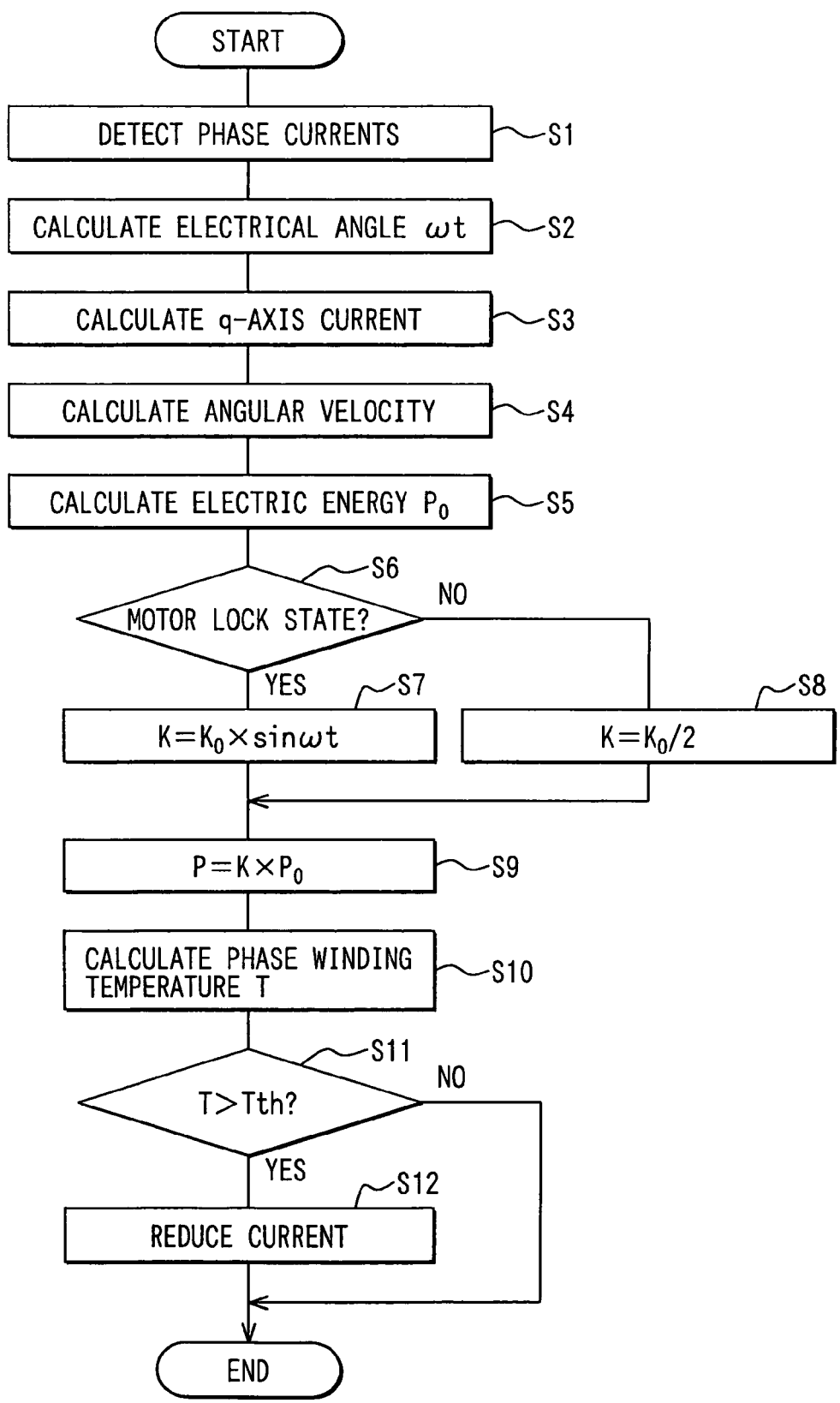
FIG. 3 is a flowchart showing one embodiment of motor protection.
Figure 4A:
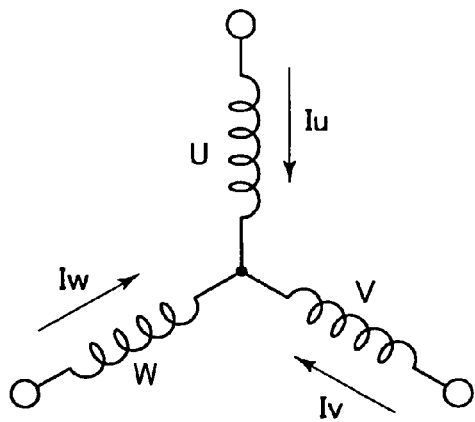
FIGS. 4A and 4B are diagrams for explaining an electric power produced in the motor.
Figure 4B:
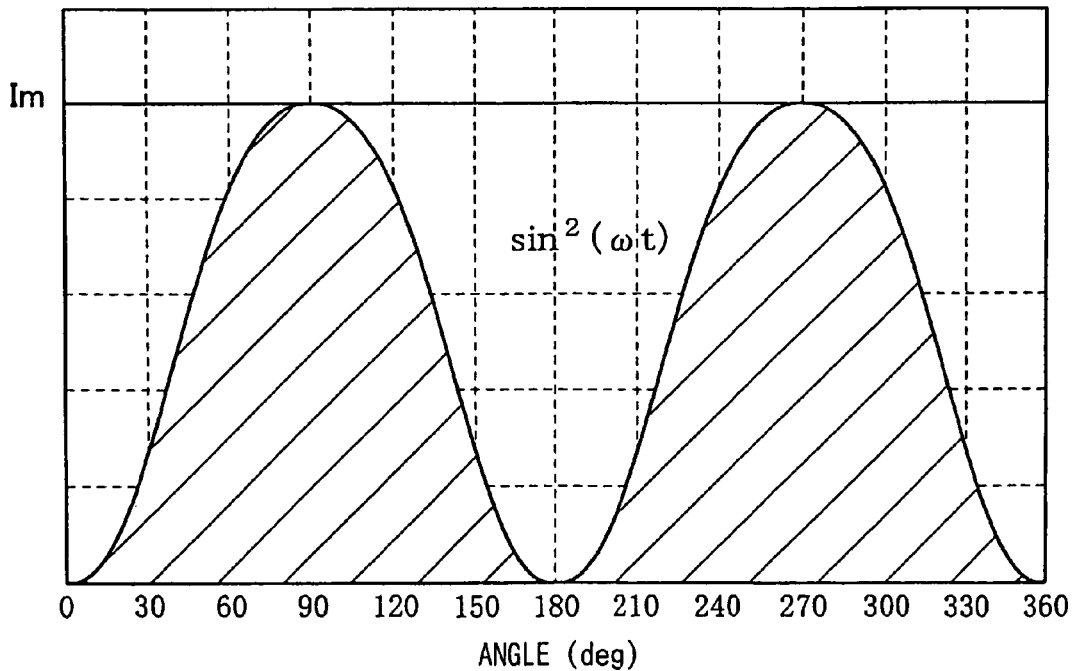
Figure 5:
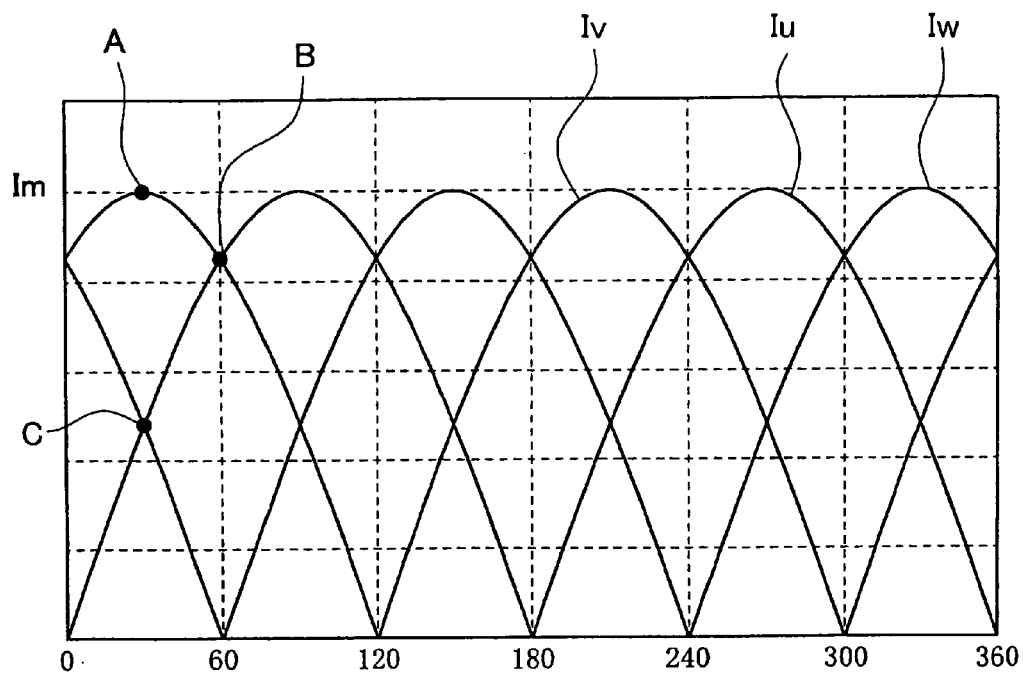
FIG. 5 is a diagram showing a relationship among phase currents.
Figure 7:
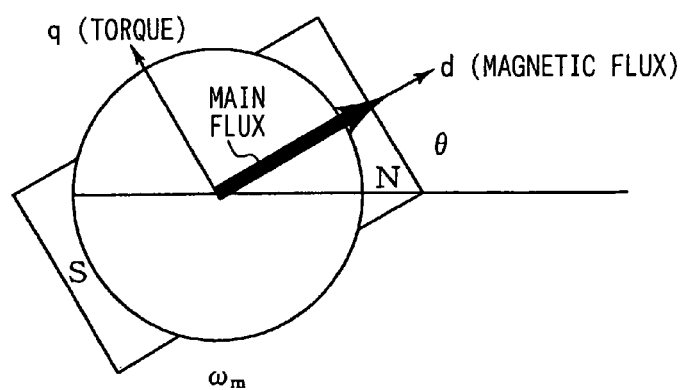
FIG. 7 is a diagram showing the principle of vector control.

The motor overheat protection processing will be described using FIG. 1 and the flowchart of FIG. 3. This processing is repeatedly performed in the controller 3. First, each of the phase current of the U-phase, V-phase and W-phase windings of the motor 1 is detected by the current sensor 4 (S1), and subsequently the electrical angle ωt is calculated in the electrical angle arithmetic unit 61 based on the rotation angle of the motor 1 detected by the rotation angle sensor 2 (S2). Then, the kwon three-phase to two-phase conversion is performed using the formula 3 based on the phase current values detected in the three-phase to two-phase conversion unit 34 to obtain the q-axis current $i_q$ (S3).

$$\begin{bmatrix} d\text{-axis current} \\ q\text{-axis current} \end{bmatrix} = \quad \text{[Formula 3]}$$

$$\frac{\sqrt{2}}{\sqrt{3}} \begin{bmatrix} \cos\varpi t & \cos\left(\varpi t - \frac{2}{3}\pi\right) & \cos\left(\varpi t - \frac{4}{3}\pi\right) \\ -\sin\varpi t & -\sin\left(\varpi t - \frac{2}{3}\pi\right) & -\sin\left(\varpi t - \frac{4}{3}\pi\right) \end{bmatrix} \begin{bmatrix} U\text{-phase current} \\ V\text{-phase current} \\ W\text{-phase current} \end{bmatrix}$$

The angular velocity is calculated in the angular velocity arithmetic unit 64 (S4) based on the rotation angle of the motor 1 detected by the rotation angle sensor 2. The angular velocity can be calculated from a change in the rotation angle per unit time.

The overheat protection arithmetic unit 65, first, multiplies a squared value of the q-axis current $i_q$ by a previously stored electric resistance r of each phase winding of the motor 1 to calculate the most recent basic electric power Po of the phase winding resulting from the q-axis current $i_q$ (S5).

Next, whether the motor 1 is in the lock state is determined.

This is done as follows: when the angular velocity obtained in the above is less than a predetermined value or when the angular velocity is less than a predetermined value and a value of the q-axis current exceeds a predetermined value, the motor 1 is determined to be in the lock state; and otherwise, the motor 1 is determined to be rotating (S6).

When the motor 1 is in the lock state (S6: YES), a predetermined coefficient Ko multiplied by a sine component (sin ωt) of the electrical angle ωt of each phase is specified as a coefficient K (S7).

When the motor 1 is determined to be rotating (S6: NO), a predetermined coefficient Ko (e.g., Ko=1) multiplied by ½ is specified as a coefficient K common to all phases: U-phase, V-phase and W-phase (S8).

A product obtained by multiplying the most recent basic electric power Po calculated previously by the coefficient obtained in the above is specified as the most recent electric power P (S9).

The most recent value P is added to stored past history data of electric power and this history data is substituted into a previously stored calculation formula to calculate the temperature T of the phase winding (S10).

Then, when any one of the calculated temperatures T of the phase windings exceeds a predetermined threshold temperature Tth stored in advance (S11: YES), the overheat protection arithmetic unit 65 sends a predetermined signal to the instruction value arithmetic unit 39. The instruction value arithmetic unit 39 receives the signal and sends a value for reducing the current flowing in the motor 1, i.e., a value that is smaller than the q-axis current instruction value and calculated according to the torque instruction value, to the subtraction circuit 38 as a q-axis current instruction value (S12). As a result, the current flowing in the motor 1 decreases, the electric power of each phase winding decreases, and the calorific value reduces as well.

Example of Application to Electronic Power Steering Apparatus

Figure 6:
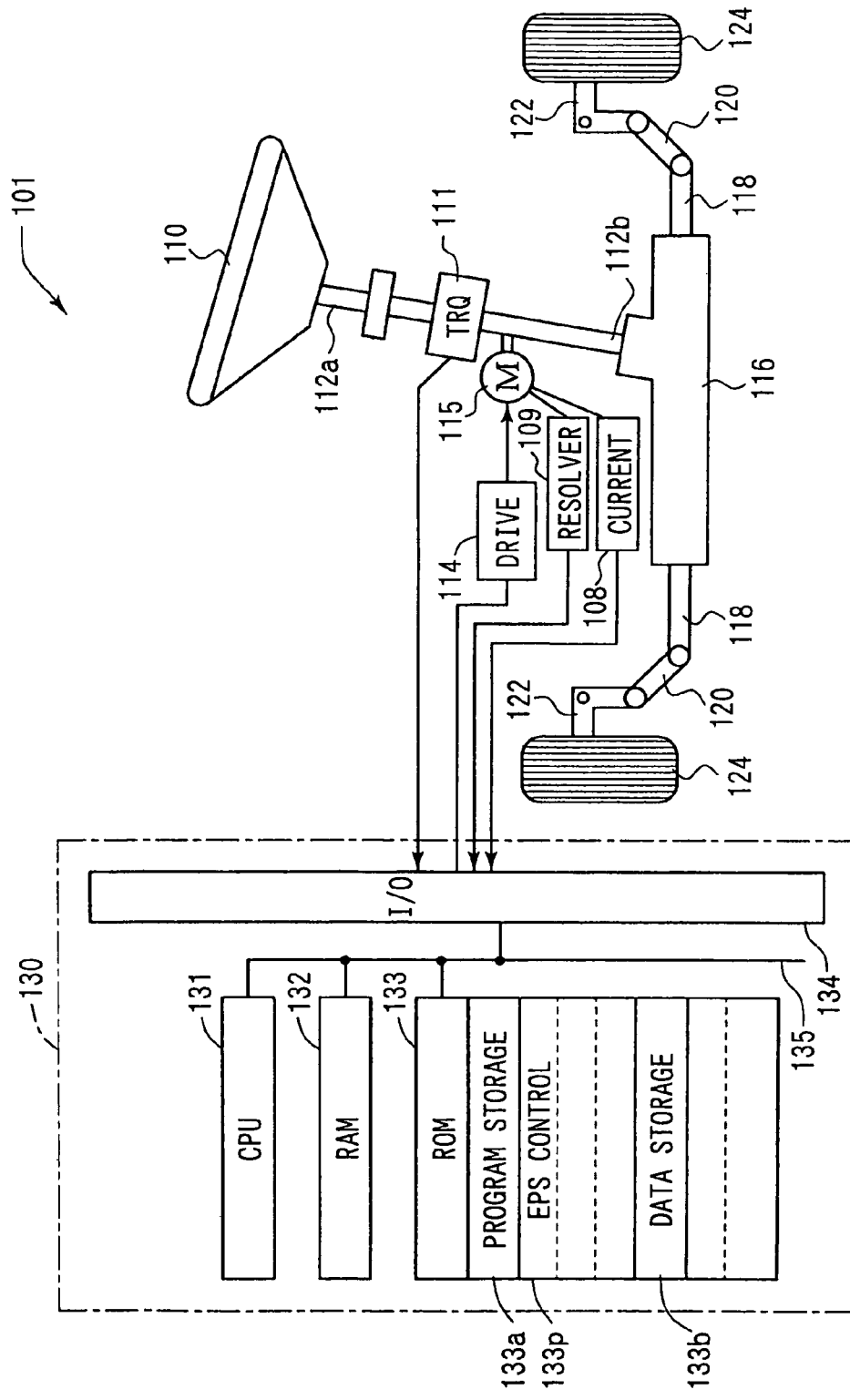
FIG. 6 is a schematic diagram showing an electronic power steering control apparatus.

The brushless motor control apparatus 3 is also suitable for an electronic power steering (EPS) apparatus of vehicles. FIG. 6 is an outline block diagram of an electronic power steering apparatus 101 to which the brushless motor control apparatus 3 is applied.

A steering wheel 110 is coupled to a steering shaft 112a and the lower end of this steering shaft 112a is coupled to a torque sensor 111 for detecting a movement of the steering wheel 110 by a driver. The upper end of a pinion shaft 112b is coupled to the torque sensor 111. A pinion (not illustrated) is provided on the lower end of the pinion shaft 112b, and this pinion is engaged with a rack bar 118 in a steering gear box 116.

Moreover, one end of each tie rod 120 is coupled to each end of the rack bar 118, respectively. The other end of the each tie rod 120 is coupled to a steering wheel 124 through a knuckle arm 122. Furthermore, an electric motor 115 that is the three-phase brushless motor is attached to the pinion shaft 112b through gears (not illustrated). A method of attaching the electric motor 115 to the rack bar 118 coaxially may be adopted.

A steering control unit 130 is equipped with a known CPU 131, RAM 132, ROM 133, an I/O 134 serving as an input and output interface, and a bus line 135 connecting these components. The CPU 131 performs control with a program and data stored in the ROM 133 and the RAM 132. The ROM 133 has a program storage area 133a and a data storage area 133b. The program storage area 133a stores an EPS control program 133p. The data storage area 133b stores data necessary for operations of the EPS control program 133p.

Through execution of the EPS control program stored in ROM 133 by the CPU 131, the steering control unit 130 calculates a drive torque that corresponds to the torque detected by the torque sensor 111 and should be produced by the electric motor 115, and makes a motor driver 114 apply a voltage for producing the calculated drive torque to the electric motor 115.

At this time, a resolver 109 detects a rotation angle of the electric motor 115 and a current sensor 108 detects a current flowing in the electric motor 115, whereby the apparatus checks whether the motor is rotating that corresponds to the drive torque and calculates a voltage to be applied to the electric motor 115 according to the result.

That is, this electronic power steering apparatus detects a current flowing in the electric motor 115 with the current sensor 108, subsequently calculates a voltage to be applied to the electric motor 115 and performs control for driving the electric motor 115 in the construction shown in FIG. 1 and FIG. 2.

In this electronic power steering apparatus 101, the vehicle may travel with the steering wheel 110 maintained at a fixed angle. This corresponds to the motor lock state described above. The rotation state of the electric motor 115 changes quickly depending on operation states of the steering wheel 110 or driving conditions. That is, by applying the brushless motor control apparatus, appropriate overheat protection that is responsive to operation states of the steering wheel 110 can be realized with excessive or too little overheat protections being avoided.

It is to be understood that these embodiments are only illustrative of the application of this invention and this invention is not limited to them, but that changes and modifications may be made based on knowledge of the those skilled in the art without departing from the spirit and scope of the invention as defined in the appended claims.

What is claimed is:

1. A brushless motor control apparatus comprising:
   current detecting means for detecting a phase current flowing in a brushless motor;
   a motor control unit that converts the phase current to a vector current including a d-axis current of a magnetic flux direction component in parallel to a magnetic flux of the brushless motor and a q-axis current of a torque direction component orthogonal to the d-axis current through a three-phase to two-phase conversion, calculates a vector voltage instruction value based on a difference between the vector current and the vector current instruction value, calculates a phase voltage instruction value by performing the two-phase to three-phase conversion on the vector voltage instruction value, and controls rotation of the brushless motor based on the phase voltage instruction value;
   electric power calculating means for calculating electric power produced in the brushless motor based on the q-axis current;
   motor protecting means for protecting the brushless motor or the motor control unit based on a magnitude of the electric power;
   electrical angle detecting means for detecting an electrical angle of the brushless motor,
   wherein the electric power calculating means calculates electric power that is produced when the brushless motor has made rotation corresponding to one cycle period in the electrical angle
   coefficient setting means for setting a predetermined coefficient based on the electrical angle, and
   wherein the predetermined threshold is determined by multiplying the electric power produced at the time of rotation corresponding to one cycle period of the electrical angle by the predetermined coefficient.

2. The brush less motor control apparatus according to claim 1, wherein the motor protecting means protects either the brushless motor or the motor control unit when the magnitude of the electric power exceeds a predetermined threshold.

3. The brushless motor control apparatus according to claim 1, wherein the motor protecting means outputs a predetermined control signal when the magnitude of the electric power exceeds a predetermined threshold.

4. The brushless motor control apparatus according to claim 1, wherein the predetermined coefficient takes different values at the time when the brushless motor is energized but not in rotation and at the time when the brushless motor is energized and in rotation.

5. The brushless motor control apparatus according to claim 1, which is applied to an electric power steering apparatus of a vehicle that provides an assisting steering torque to a steering mechanism by driving the brushless motor on energization triggered by a driver's steering operation.

* * * * *